United States Patent Office 3,228,874
Patented Jan. 11, 1966

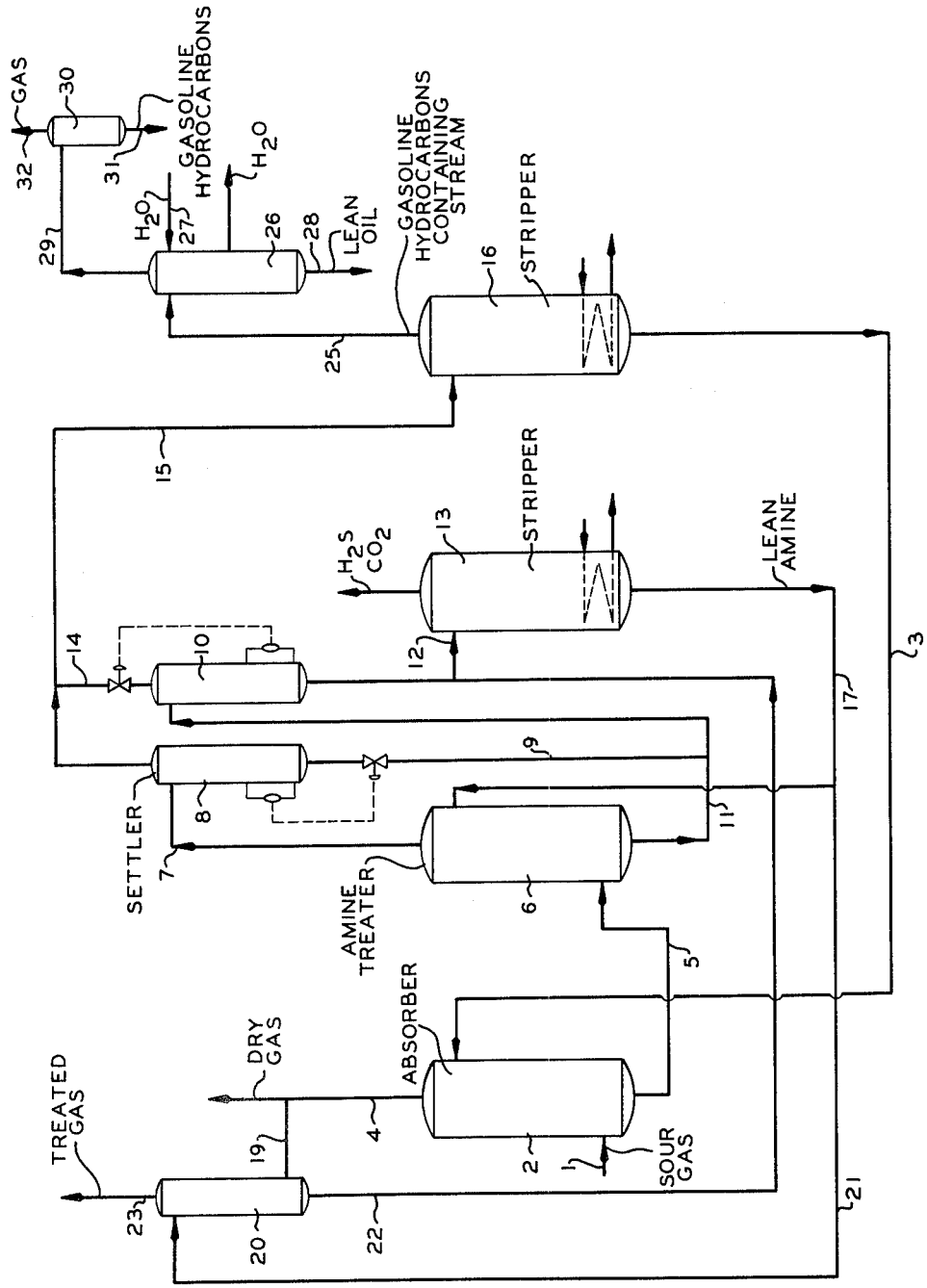

3,228,874
METHOD FOR RECOVERING A PURIFIED
COMPONENT FROM A GAS
Maurice M. Morgan, Bartlesville, Okla., assignor to
Phillips Petroleum Company, a corporation of Delaware
Filed Aug. 22, 1961, Ser. No. 133,156
5 Claims. (Cl. 208—236)

This invention relates to a method for the recovery of a purified component from a gas. In one of its aspects, the invention relates to the recovery of a sweetened hydrocarbon from a sour natural gas by contacting the same with an absorption oil under conditions causing absorption into said oil of a gasoline hydrocarbon, treating the rich absorption oil thus obtained to remove therefrom components rendering the same sour, and then recovering a sweetened hydrocarbon from the sweetened absorption oil. In another of its aspects, the invention relates to an operation, as described, wherein the gas remaining after the absorption of gasoline component therefrom is separately treated to a desired extent to reduce its content of impurities or sulfur compounds, the extent to which the reduction of impurities is effected being independent from that of the gasoline component which is also treated, as also described.

Further, the invention relates to a method to accomplish each or all of the separate aspects and objects of the invention.

Natural gas containing gasoline hydrocarbons can contain undesirable amounts of sulfur and other compounds such as carbon dioxide which are undesirable in the finished gasoline product. Further, the residue gas obtained from the absorption of natural gas should also be substantially free of sulfur compounds, etc., which are undesirable as is known in the art.

It is an object of this invention to purify a gas. Another object of the invention is to provide a method for purifying a component of a gas, such as natural gas. A further object of this invention is to provide a method wherein the gasoline components contained in a natuaral gas can be separately sweetened apart from any sweetening or treatment of the dry gas remaining upon absorption of said natural gasoline components from said natural gas. It is a further object of the invention to provide a continuous operation for the sweetening of a natural gas containing natural gasoline components.

Other aspects, objects and the several advantages of the invention are apparent from a study of this disclosure, the drawing and the appended claims to the invention.

According to the present invention there is provide a method for obtaining a purified component from a gas which comprises absorbing said component from said gas into an absorption medium, treating said asborption medium containing said component to purify said medium and component of any undesirable impurities absorbed into said medium with said component, and then recovering said now-purified component from said medium.

Also, according to the invention, there is provided a method for treating the residue gas remaining after absorbing said component from said gas, in the method the said residue gas remaining being separately treated to purify the same to a desired extent which can be different from the extent to which the said component of said gas has been purified.

Still further, according to the invention, as will be evident from that which follows, a sweetened gasoline component obtained according to the invention from a natural gas, can be fractionated to obtain therefrom a sweet gas residue, the amount of said gas residue obtainable from the sweetened component or gasoline being determined initially by the conditions under which the absorption zone in which the gas is treated with an absorption medium is operated.

Referring now to the drawing, there is shown diagrammatically an operation according to the invention wherein there can be obtained sweetened gasoline hydrocarbons, a residue gas which is substantially free from sulfur compounds such as hydrogen sulfide as well as dry gas which can be treated to a desired extent also to remove hydrogen sulfide or other sulfur-containing impurities therefrom.

Referring to the drawing, sour gas is passed through line 1 into absorber 2. Lean oil is passed through line 3 into absorber 2, dry gas passes from absorber 2 through line 4 and sour rich oil passes from absorber 2 through line 5 and into amine treater 6. The sour rich oil is countercurrently contacted in treater 6 with amine solution. The treated rich oil flows from amine treater 6 through line 7 into settler 8. Entrained amine solution settles to the bottom of vessel 8 and is drained through line 9 into settler 10. Rich amine solution passes from treater 6 into line 11 and into settler 10. Rich amine solution passes from settler 10 through line 12 into a stripper 13. Lean amine solution from stripper 13 is recycled through line 17 into treater 6. Rich oil that rises to the top of settler 10 is passed through line 14, and into line 15. Rich oil from settler 8 also passes into line 15 and into stripper 16. Lean oil from stripper 16 is recycled through line 3 into absorber 2.

The stripped natural gasoline vapors from stripper 16 can be passed into a dephlegmator to recover entrained lean oil and the vapors from the dephlegmator are separated or fractionated to obtain stabilized natural gasoline and a residue gas that is free of hydrogen sulfide. Thus, overhead 25 from stripper 16 is passed to dephlegmator or fractionator 26 wherein water injected at 27 causes lean oil to drop out from the vapors. The oil is withdrawn at 28. Vapors passed by pipe 29 into gas separator 30, gasoline hydrocarbons are obtained at 31 and gases at 32.

As a feature of the present invention the dry gas in pipe 4 can be treated by passing it by pipe 19 into treater or absorber 20 wherein it is contacted with amine solution furnished by pipes 17 and 21. A sweetened dry gas is obtained at 23. Used amine solution is passed by pipe 22 to pipe 12 for treatment in stripper 13.

From a consideration of the description of the invention made herein it will be clear to one skilled in the art that only a portion of the total sour gas need be treated to obtain sweet gasoline hydrocarbons. Indeed, a large quantity of the gas, i.e., the dry gas passing overhead from absorber 2, need not be contacted with the amine solution to obtain a sweet gasoline. The savings and advantages here inherent are inclusive of lower cost, smaller equipment, less treating agent used, etc.

The extents of the treatments accomplished in 6 and 2 can be different. As a further feature of the invention flexibility is provided on how much gas is absorbed at 2 and therefore, in the compositions and extensive treatment of the gas streams 23 and 32.

Reasonable variation and modification are possible within the scope of the foregoing disclosure, drawing and the appended claims to the invention the essence of which is that a method has been provided for removing a component from a gas, treating said component while it is in the absorbing medium with which it has been removed from said gas and then recovering the treated component from said absorbing medium, in a modification the treated component being then separated into constituents of which it may exist, and in a further modification still separately treating to a desired extent unabsorbed gas remaining upon the use of said absorbing medium as herein described.

I claim:
1. A method of recovering sweetened gasoline hydro- carbon fraction from a sour natural gas containing $H_2S$ and $CO_2$ which comprises: contacting said gas in a contacting zone with an absorption oil under conditions causing absorption from said sour gas into said absorption oil of a gasoline hydrocarbon fraction, $H_2S$ and $CO_2$ thereby yielding a rich absorption oil; removing said rich absorption oil containing said gasoline hydrocarbon fraction, $H_2S$ and $CO_2$, from said zone; countercurrently contacting said rich absorption oil with a non-miscible amine solution thereby removing from the rich absorption oil substantially completely said $H_2S$ and $CO_2$, separating the amine solution from rich absorption oil; and stripping said rich absorption oil, and recovering a substantially completely sweetened gasoline hydrocarbon fraction, said sweetened hydrocarbon fraction being essentially free from $H_2S$ and $CO_2$.

2. A method of recovering a sweetened gasoline hydrocarbon fraction from a sour natural gas containing same which comprises: contacting said gas with a liquid absorption medium in an absorption zone, and absorbing said gasoline hydrocarbon fraction and sour gas; obtaining and removing an enriched absorption medium containing said hydrocarbon fraction and said sour gas; and separately removing the unabsorbed gas from said zone; contacting said enriched absorption medium with a substantially non-miscible liquid treating agent adapted to substantially completely sweeten said enriched absorption medium by removing said sour gas from the enriched absorption medium; settling the liquid treating agent and the liquid absorption medium admixture, separating the thus-contacted liquid absorption medium from said liquid treating agent; and recovering the substantially completely sweetened gasoline hydrocarbon fraction from said enriched absorption medium.

3. A method according to claim 2 wherein the unabsorbed gas is further contacted with a liquid non-miscible treating agent, thereby absorbing additional sour gas.

4. A method according to claim 2 wherein the sweetened gasoline hydrocarbon fraction is fractionated and distillate gasoline hydrocarbons are removed.

5. A method of recovering a sweetened gasoline hydrocarbon from a sour natural gas containing $H_2S$ and $CO_2$ which comprises: contacting said sour natural gas in a contacting zone with an absorption oil and absorbing said sour gas containing $H_2S$ and $CO_2$ and a gasoline hydrocarbon into said absorption oil thereby yielding a rich absorption oil; removing said rich absorption oil containing said gasoline hydrocarbon and said sour gas containing $H_2S$ and $CO_2$ from said zone; countercurrently contacting in a contacting zone said rich absorption oil with a non-miscible amine-containing solution at a temperature in the range of about 180° F. to about 240° F. and a pressure in the range of about 7 p.s.i.g. to about 10 p.s.i.g.; and substantially completely removing from the rich absorption oil $H_2S$ and $CO_2$; separately recovering from said contacting zone a substantially completely sweetened oil and the amine solution and thereafter recovering a gasoline hydrocarbon from the rich absorption oil.

References Cited by the Examiner
UNITED STATES PATENTS

| Re. 18,958 | 9/1933 | Bottoms. | |
|---|---|---|---|
| 2,457,959 | 1/1949 | Walker | 55—175 |
| 2,487,577 | 11/1949 | Stanley | 208—236 |
| 2,497,954 | 2/1950 | McCulley | 208—236 |
| 2,598,034 | 5/1952 | Brown et al. | 23—3 |
| 2,620,895 | 12/1952 | Turner | 55—93 |
| 2,868,326 | 1/1959 | Gilmore | 55—37 |
| 2,886,405 | 5/1959 | Benson et al. | 23—3 |
| 2,998,095 | 8/1961 | Mitchell | 55—51 |
| 3,004,915 | 10/1961 | Kant | 208—236 |
| 3,099,619 | 7/1963 | Harper | 208—341 |
| 3,100,680 | 8/1963 | Shaw et al. | 23—3 |
| 3,117,079 | 1/1964 | Harper | 208—341 |
| 3,132,011 | 5/1964 | Kimble et al. | 55—40 |

OTHER REFERENCES

Noel H. M.: Petroleum Refinery Manual, N.Y., Reinhold Publishing Corporation (1959) pages 128, 138 and 149.

REUBEN FRIEDMAN, *Primary Examiner.*

HERBERT L. MARTIN, *Examiner.*